United States Patent
Riedl

(10) Patent No.: US 9,586,624 B2
(45) Date of Patent: Mar. 7, 2017

(54) REINFORCING STRUT

(71) Applicant: Bayerische Motoren Werke Aktiengesellschaft, Munich (DE)

(72) Inventor: Wilhelm Riedl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/732,017

(22) Filed: Jun. 5, 2015

(65) Prior Publication Data
US 2015/0266513 A1   Sep. 24, 2015

Related U.S. Application Data

(63) Continuation of application No. PCT/EP2013/074474, filed on Nov. 22, 2013.

(30) Foreign Application Priority Data
Dec. 7, 2012 (DE) .................. 10 2012 222 559

(51) Int. Cl.
*B62D 25/08* (2006.01)
*B62D 29/04* (2006.01)

(52) U.S. Cl.
CPC ......... *B62D 25/082* (2013.01); *B62D 25/084* (2013.01); *B62D 25/085* (2013.01); *B62D 29/043* (2013.01)

(58) Field of Classification Search
CPC .... B62D 25/08; B62D 25/081; B62D 25/082; B62D 25/084; B62D 25/085; B62D 25/088; B62D 29/043
USPC ........... 296/187.01, 187.09, 193.09, 203.01, 296/203.02, 29, 30
See application file for complete search history.

(56) References Cited

U.S. PATENT DOCUMENTS

| | | | | |
|---|---|---|---|---|
| 3,086,606 A * | 4/1963 | Schwiering | .......... | B62D 25/082 180/68.4 |
| 3,188,132 A * | 6/1965 | Schwiering | .......... | B62D 25/082 296/203.02 |
| 4,729,156 A * | 3/1988 | Norris, Jr. | .............. | B62D 65/00 29/401.1 |
| 5,411,311 A * | 5/1995 | Shimmell | ............ | B62D 25/082 280/798 |

(Continued)

FOREIGN PATENT DOCUMENTS

| | | |
|---|---|---|
| DE | 1 177 952 | 9/1964 |
| DE | 199 28 588 A1 | 12/2000 |

(Continued)

OTHER PUBLICATIONS

Computer translation of DE 102004062489.*
International Search Report (PCT/ISA/210) dated May 30, 2014, with English translation (Four (4) pages).

*Primary Examiner* — Gregory Blankenship
(74) *Attorney, Agent, or Firm* — Crowell & Moring LLP

(57) ABSTRACT

A strut is provided for reinforcing a vehicle body of a vehicle, in particular an engine compartment, wherein the strut has a first fastening portion and a second fastening portion for fastening the strut to the vehicle body. Further fastening portions are, situated between the first and second fastening portion, for further fastening the strut to points on the vehicle. The strut has a profile with at least two vertices between the first fastening portion and the second fastening portion.

20 Claims, 3 Drawing Sheets

(56) References Cited

U.S. PATENT DOCUMENTS

| | | | | |
|---|---|---|---|---|
| 7,219,954 B2* | 5/2007 | Gomi | ............ | B62D 25/082 296/187.09 |
| 7,560,003 B2* | 7/2009 | Naughton | ............ | B29C 65/58 156/292 |
| 8,128,160 B2* | 3/2012 | Leanza | ............ | B62D 25/082 296/187.09 |
| 2006/0027993 A1* | 2/2006 | Takayanagi | ............ | B60G 15/067 280/124.166 |
| 2007/0035159 A1* | 2/2007 | Cate | ............ | B62D 21/152 296/187.09 |
| 2008/0122146 A1* | 5/2008 | Herntier | ............ | B62D 25/088 267/2 |
| 2008/0122264 A1* | 5/2008 | Wrobel | ............ | B62D 21/157 296/203.02 |
| 2009/0039674 A1 | 2/2009 | Hassdenteufel et al. | | |
| 2010/0060039 A1* | 3/2010 | Riviere | ............ | B60K 11/04 296/193.09 |
| 2013/0207416 A1* | 8/2013 | Nagahori | ............ | B62D 21/152 296/187.09 |
| 2014/0159429 A1* | 6/2014 | Chung | ............ | B62D 25/08 296/193.09 |
| 2015/0061325 A1* | 3/2015 | Cho | ............ | B62D 25/085 296/193.09 |
| 2015/0076867 A1* | 3/2015 | Bechtler | ............ | B62D 25/082 296/203.02 |
| 2015/0102636 A1* | 4/2015 | Cho | ............ | B62D 25/082 296/187.09 |
| 2015/0166108 A1* | 6/2015 | Persson | ............ | B62D 21/152 296/187.09 |
| 2015/0266513 A1* | 9/2015 | Riedl | ............ | B62D 29/043 296/203.02 |
| 2015/0274211 A1* | 10/2015 | Riedl | ............ | B62D 25/084 296/187.09 |

FOREIGN PATENT DOCUMENTS

| | | |
|---|---|---|
| DE | 10 2004 062 489 A1 | 7/2006 |
| EP | 2 014 501 A1 | 1/2009 |
| JP | 2000-118443 A | 4/2000 |

* cited by examiner

REINFORCING STRUT

CROSS REFERENCE TO RELATED APPLICATIONS

This application is a continuation of PCT International Application No. PCT/EP2013/074474, filed Nov. 22, 2013, which claims priority under 35 U.S.C. §119 from German Patent Application No. 10 2012 222 559.5, filed Dec. 7, 2012, the entire disclosures of which are herein expressly incorporated by reference.

BACKGROUND AND SUMMARY OF THE INVENTION

The invention relates to a strut for reinforcing a vehicle body and a front end module for a vehicle.

It is known in the prior art in general that reinforcing struts are used in motor vehicles to stabilize and/or reinforce the body. Such reinforcing struts are installed inside the engine compartment in particular to increase the torsional rigidity of the vehicle body in this region. The publication DE 199 28 588 A1 shows one such example. The reinforcing struts disclosed in this publication run from a central region of the vehicle body, located beneath the front windshield, to the suspension strut mounts, where the reinforcing struts are attached either directly to the suspension strut mounts or to a strut brace connecting the suspension strut mounts.

As this also shows, different struts are provided between points on the vehicle body to increase their rigidity.

If high demands are to be met regarding the rigidity of the vehicle body, this leads to assembly of a plurality of struts and also other reinforcing elements and therefore to a greater weight of the vehicle and more work in its assembly.

The object of the invention is to provide a strut that improves a vehicle body, which will make it possible to reinforce the vehicle body well in a lightweight design.

This and other objects are achieved with a strut according to embodiments of the invention for reinforcing a vehicle body of a vehicle, in particular an engine compartment, wherein the strut includes: a first fastening section and a second fastening section for fastening the strut onto the vehicle body, and additional fastening sections for additional fastening of the strut to points in the vehicle. The additional fastening sections are provided between the first and second fastening sections. The strut has a profile that includes at least two vertices between the first fastening section and the second fastening section.

The basic idea of the invention is to create a strut having a profile such that the strut connects various points on the vehicle and, at the same time, assumes various partial functions due to the specific profile.

A strut according to an embodiment of the invention for reinforcing the vehicle body of a vehicle has a first fastening section and a second fastening section for fastening the strut on the vehicle body. The strut is fastened onto lateral support brackets of the vehicle body by way of the first and second fastening sections, for example.

Additional fastening sections for additional fastening of the struts at various points in the vehicle are located between the first and second fastening sections, wherein the strut has a profile with at least two vertices between the first fastening section and the second fastening section.

Due to the fact that the strut has at least two vertices, the strut runs in different sections of the vehicle body and/or at different points in the vehicle and can be attached there by use of the additional fastening sections. The struts and/or their subsections therefore take over various functions and/or stability functions, which is why the body is reinforced well by providing the strut according to the invention.

Furthermore, due to the specific profile of the strut, the number of stability elements, such as struts and shear fields, to be installed can be reduced, which permits weight savings and a lightweight design.

The profile of the strut is, in particular, a profile, which the strut follows in the installed state—projected onto an X-Y plane (the X direction corresponds to the intended direction of travel of the vehicle; the Y direction corresponds to the direction perpendicular to the direction of travel, i.e., the transverse direction or the width direction).

The additional fastening sections are preferably each provided on one of the at least two vertices.

In addition, the profile of the strut preferably also has three vertices, one of the additional fastening sections being arranged on each of these vertices. In this way, the profile of the strut has an M shape or a W shape, wherein the strut can be fastened at the vertices in corresponding points in the vehicle to reinforce the vehicle body.

Due to this design of the strut, different desired force flow paths in particular can be implemented.

For example, one of the three vertices forms a middle vertex, through which an axis of symmetry of the strut runs. The first leg sections extend from the middle vertex in the direction of the remaining vertices, and the second leg sections extend from the remaining vertices to the first and/or second fastening section(s).

The first leg sections are preferably of such dimensions that the additional fastening section located on the middle vertex can be attached to a front end module of the vehicle, and the additional fastening sections, which are positioned on the remaining vertices, can be fastened in the area of the suspension strut mounts of the vehicle.

The second leg sections are preferably of such dimensions that the first fastening section and the second fastening section can each be fastened to a lateral support bracket of the vehicle body.

Due to this design of the strut according to the invention, forces acting on the front end module of the motor vehicle, for example, in a collision can be directed over the first leg sections in the direction of the suspension strut mounts.

The second leg sections preferably take over the function of reinforcing the vehicle body to the extent that it fulfills the requirements in a crash with little overlap.

Consequently, the strut according to the invention assumes multiple partial functions, wherein this is only one single element to be installed.

To further improve the introduction of force into the vehicle body, the strut may have additional fastening sections between the middle vertex and the remaining vertices in the first leg sections, such that the struts can be fastened as intended onto a reference strut connecting the lateral support brackets.

The strut is designed, for example, from a base body, which defines the profile, wherein the first and second fastening sections and the additional fastening sections are integrated into this base body. The additional fastening sections are preferably also integrated into the base body.

In this way the entire strut may be designed to be in one piece.

To reduce the weight of the strut, the base body is preferably designed of a fiber-plastic composite material in one piece. For this material, it is possible to use, for example, glass fibers, which can be enclosed in a plastic, for example, a thermosetting plastic resin (e.g., polyester resin UP or epoxy resin) or enclosed in a thermoplastic (e.g., polyamide).

However, the fibers to be used may also include carbon fibers embedded in a plastic matrix, for example, of thermosetting plastics (epoxy resin) or thermoplastics.

The strut is manufactured in a resin transfer molding method, abbreviated RTM, for example.

The strut preferably also forms a part of a front end body according to the invention, which is provided for a front end module. A front end module is a structure, which preferably holds elements such as headlights, radiator grill, etc., and is brought up to the vehicle and fastened there during assembly for finishing the front end region.

A front end body has the strut according to the invention, wherein this strut is preferably fastened to a front cross strut with the additional fastening section being located on the middle vertex and the additional fastening sections being fastenable at certain points in the vehicle.

A preferred specific embodiment of the strut and of a front end body is explained below.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
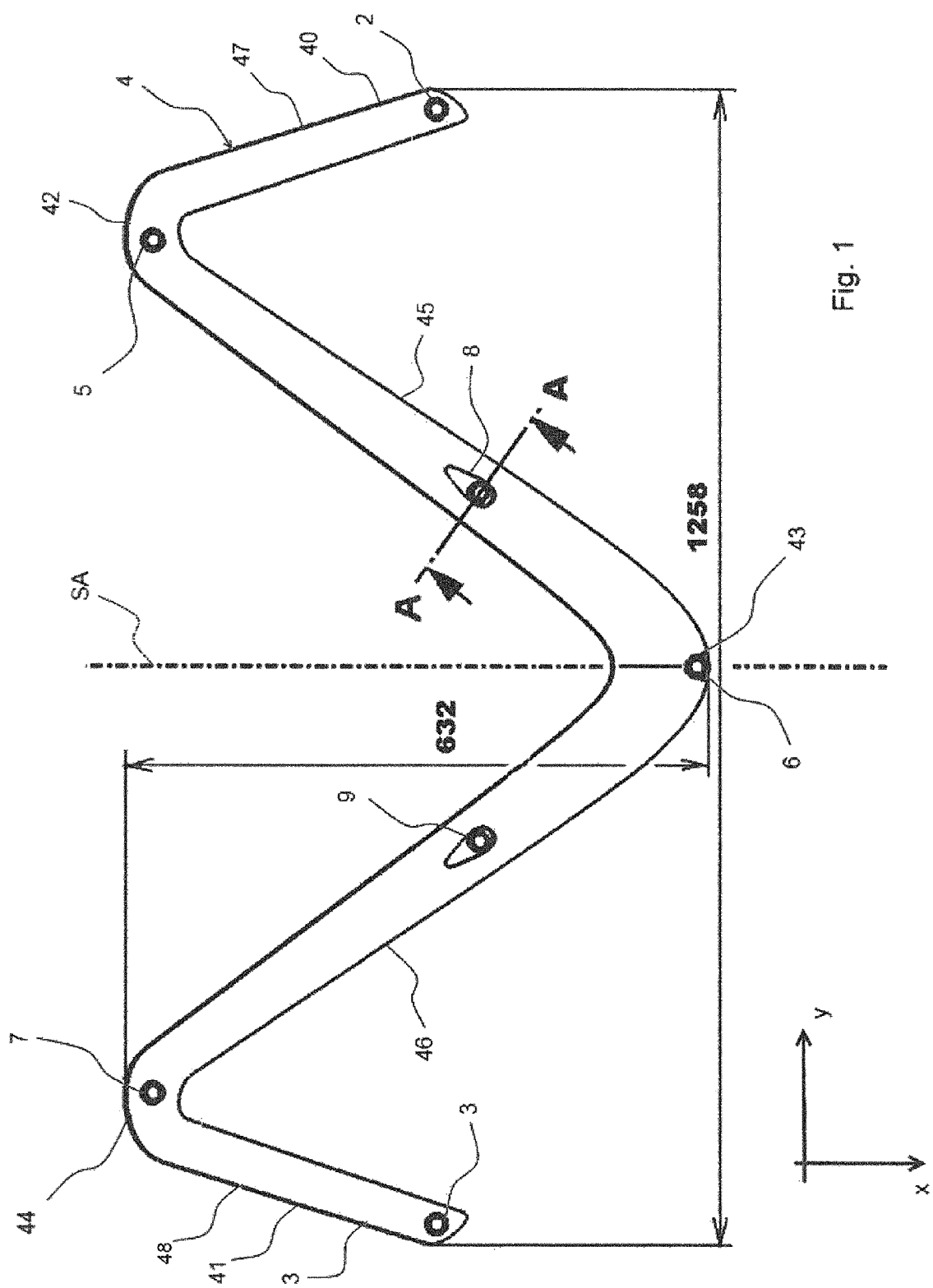
FIG. 1 is a diagram of a specific embodiment of the strut according to the invention in a view from above, i.e., from a direction perpendicular to an X-Y plane, wherein the X direction represents the intended direction of travel of the vehicle, and the Y direction is the direction perpendicular to the former.

FIG. 1 shows a preferred embodiment of the strut 1 according to the invention.

Figure 2:
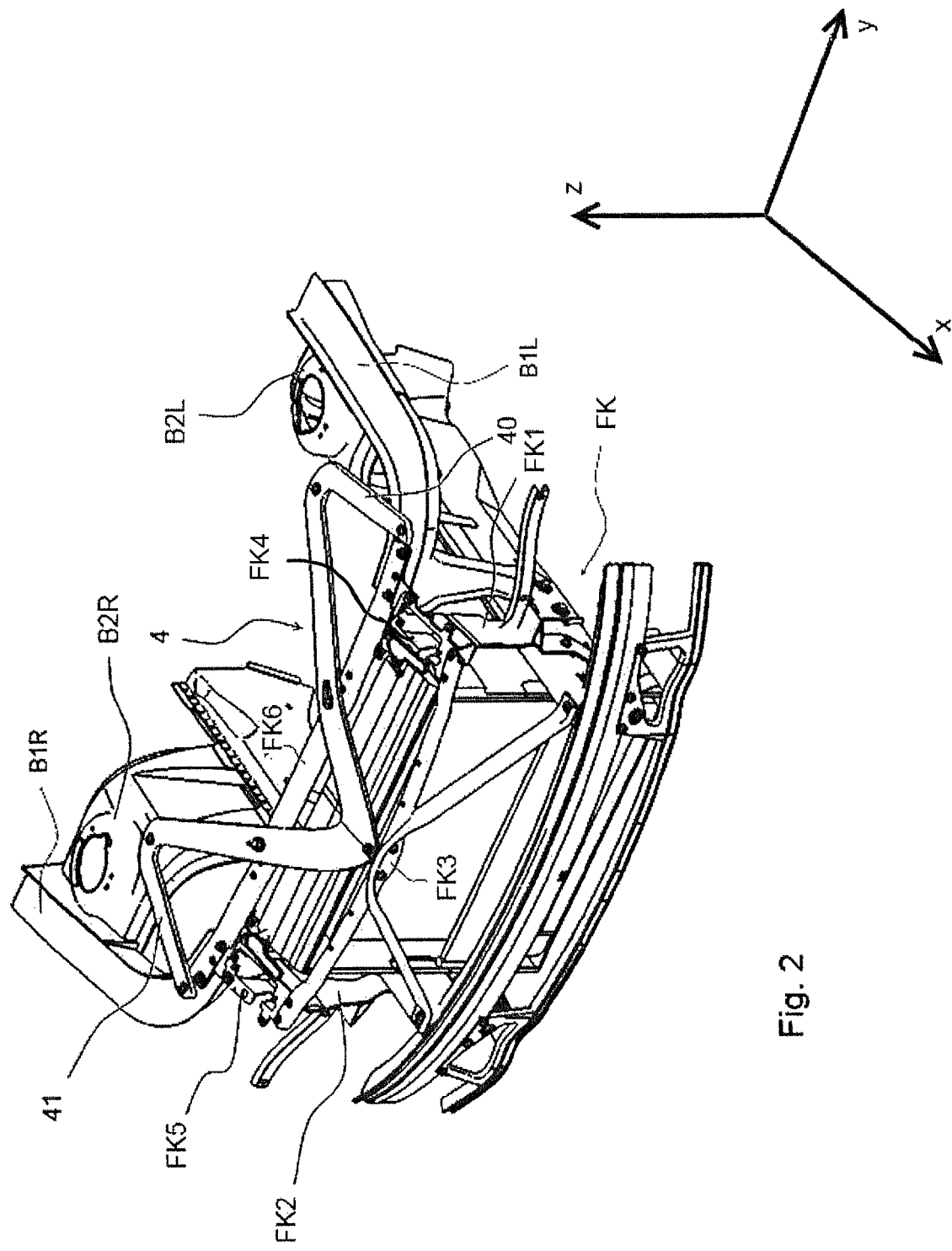
FIG. 2 is a perspective view of the strut according to an embodiment of the invention after being installed and of a front end body according to an embodiment of the invention.

FIG. 2 shows this strut 1 after being installed.

With reference to FIG. 1 as well as FIG. 2, the basic structure of the strut and the front end body are described below.

The strut has a base body 4, which defines the profile of the strut 1.

A fastening section 2, 3 is located in end regions 40, 41 in the direction of longitudinal extent of the base body 4. A first fastening section 2 is formed in the first end region of the strut 1 and a second fastening section 3 is formed in the second end section 41 of the strut 1.

As shown in FIG. 2, the strut 1 is fastened to a left support bracket B1L via the first fastening section 2 and is attached to a right support bracket B1R of the base body B via the second fastening section 3. This fastening is preferably established by a releasable connection, for example, a screw connection.

As shown from the combined view of FIGS. 1 and 2, the view shown in FIG. 1 forms a view from above, corresponding to the installed state of the strut 1.

The X direction shown in FIGS. 1 and 2 corresponds to the direction of travel of the vehicle equipped with the strut 1, and the Y direction shown in the figures corresponds to the width direction of the vehicle running across the former. Finally, the Z direction shown in FIG. 2 forms the height direction of the vehicle.

In other words, the diagram in FIG. 1 shows the profile of the strut 1, as seen from the height direction—projected onto the X-Y plane. As can be seen in FIGS. 1 and 2, the base body 4 and/or the strut 1 has/have on the whole a profile located in this plane with at least two vertices or three vertices 42, 43, 44 in the specific embodiment. In other words, the strut 1 has an M-shaped or W-shaped profile in the X-Y plane.

Based on this profile of the base body 4 and/or of the strut 1, different sections of the strut 1 may assume different functions.

Between the first fastening section 2 and the second fastening section 3, the strut 1 has a plurality of additional and further fastening sections.

One of the additional fastening sections 6, by which the strut 1 is fastened as intended onto a front end body FK, as shown in FIG. 2, is formed on the middle vertex 43. One each of the additional fastening sections 5, 7 is also provided on the remaining vertices 42, 44, wherein the strut 1 is fastened as intended in regions of the suspension strut mounts B2L and B2R by way of these additional fastening sections 5, 7.

The front end body FK shown in FIG. 2 forms a basic structure for the construction of a front end module. The finished front end module includes, in general, headlights, turn lights, radiator grill, etc., and is preassembled for completion of the front region of the vehicle. During the manufacture of the vehicle, the front end module is moved toward the body B of the vehicle and fastened thereon.

The front end body FK shown in FIG. 2 includes a first lateral support element FK1 and a second lateral support element FK2, which are connected at their end, facing in the direction of travel (X direction), by way of a cross strut FK3. Fastening elements FK4, FK5 are formed on the upper rear ends of the lateral support elements FK1, FK2, i.e., on the ends facing in the negative X direction. The front end body FK and/or the front end module can be fastened onto the base body B by way of these fastening elements FK4, FK5—which can also be referred to as a lock.

As shown in FIG. 2, the strut 1 is fastened onto the forward cross strut FK3 connecting the lateral support elements FK1, FK2 by way of the middle fastening section 6. The fastening takes place on a middle, i.e., central, section of the cross strut FK3 located in the Y direction, i.e., in the transverse direction, i.e., the width direction of the vehicle.

The strut 1 is designed with axial symmetry through the axis of symmetry SA running through the middle vertex 43.

As shown in FIGS. 1 and 2, the first leg sections 45, 46 extend from the middle vertex 43 in the direction of the remaining vertices 42, 44. The strut 1 therefore has a V-shaped section, wherein the first leg sections 45, 46 are of such dimensions in their direction of extent that, as shown in FIG. 2, the strut 1 can be fastened with its middle fastening section 6 onto the cross strut FK3 of the front end body FK and with its additional fastening sections 5, 7 in the region of the suspension strut mounts B2L, B2R. The first leg sections 45, 46, for example, take over the function of diverting a force acting on the front end body FK in the negative X direction, in the direction of the suspension strut mounts, and therefore in the direction of the lateral support brackets B1L, B1R.

Furthermore, additional fastening sections 8, 9, by which the strut can be fastened onto a reference strut FK6 shown in FIG. 2, are also preferably formed in the first leg sections 45, 46. This reference strut FK6 is a reference to the orientation of the front end module and/or the front end body FK with respect to the base body B. The reference strut FK6 is fastened onto the right and left support brackets B1R, B1L before the fastening, i.e., assembly, of the front end module such that the reference strut connects the two strut carriers at their front ends. During the manufacture of the vehicle, the front end module is brought up to the reference strut FK6 and oriented with it. Next the front end module is fastened onto the base body B by way of the locks FK4, FK5. The torsional rigidity of the body is additionally improved due to the fact that the strut 1 can be fastened onto the reference FK6 by way of the additional fastening sections 8, 9.

Furthermore, the strut 1 also assumes the function of a shear field (not shown), which would have to be provided for reinforcement and/or stabilization in the region between the front cross strut FK3 and the reference strut FK6. This shear field can be omitted, based on the design of the strut 1 according to the invention.

Starting from the remaining vertices 42, 44, the strut runs further in the direction of the first fastening section 2 and/or the second fastening section 3, which are provided on the end regions 40, 41 of the strut 1. These sections of the strut 1 form the second leg sections 47, 48 of the strut 1.

The second leg sections 47, 48 are of such dimensions that, as shown in FIG. 2, the first fastening section 2 and the second fastening section 3 can each be fastened onto the respective left and right support bracket B1L and B1R. To this extent, the second leg sections 47, 48 form a force flow path between the left suspension strut mount B2L and the left support bracket B1L and/or the right suspension strut mount B2R and the right support bracket B1R. The forces acting on the left support bracket B1L or the right support bracket B1R are conducted in the direction of the respective suspension strut mount in this way. The second leg sections 47, 48 assume the function that the body will fulfill the requirements of a collision with little (small) overlap.

As is apparent from the preceding description, the strut 1 has different function regions, each of which assumes certain partial functions.

The dimensions shown in FIG. 1 correspond to the preferred dimensions, which are given in mm (millimeters).

With regard to the material, the strut is preferably produced from a fiber-plastic composite material. Examples of suitable fibers include glass fibers and/or carbon fibers. Examples of suitable plastics include thermosetting plastics or thermoplastic materials.

Figure 3:
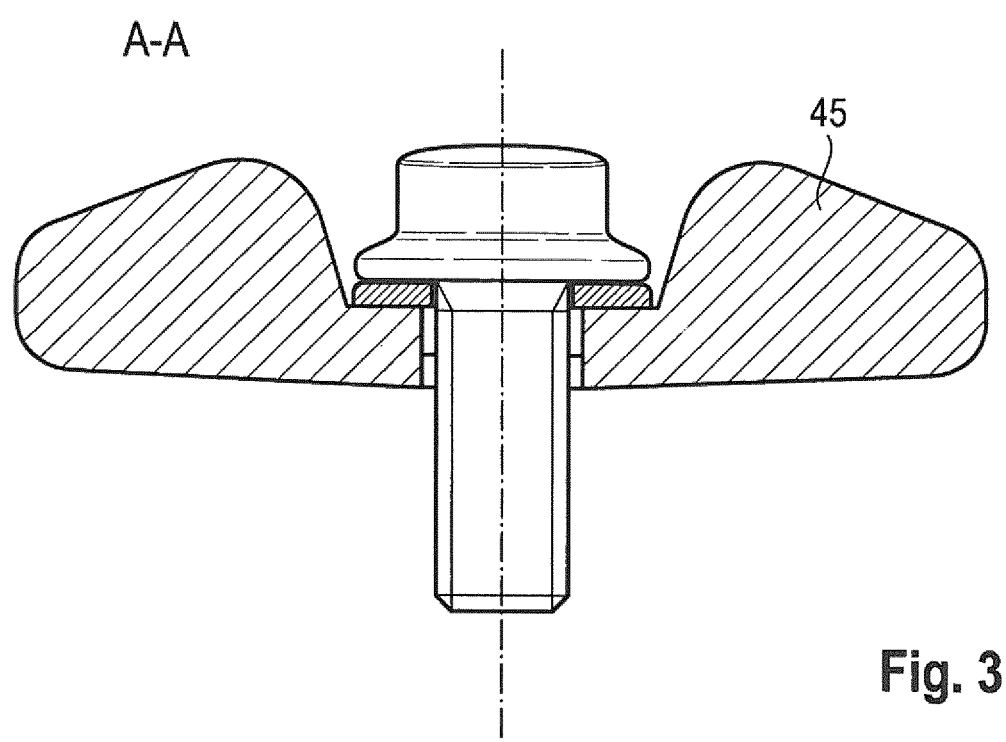
FIG. 3 is a cross section view through the strut, taken along the sectional A-A shown in FIG. 1.

FIG. 3 show a schematic cross section through the strut 1 according to the invention along the sectional line A-A shown in FIG. 1. As this shows, the additional fastening section 8 is implemented by an insert integrated into the base body 4. A fastening device, for example, a screw, can be guided through this insert and fastened on the reference strut FK6. The other fastening sections are implemented in an equivalent manner.

As is understandable from the preceding description, a strut 1 may be provided for reinforcement of a vehicle body, which improves the rigidity of the vehicle in general.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A strut for reinforcing a vehicle body of a vehicle, comprising:
   a first fastening section of the strut and a second fastening section of the strut, the first and second fastening sections being configured to fasten the strut onto the vehicle body; and
   one or more additional fastening sections of the strut configured to additionally fasten the strut to points in the vehicle, the one or more additional fastening sections being located between the first and second fastening sections, wherein
   the strut has a profile including three vertices between the first fastening section and the second fastening section, at each one of which an additional one of the one or more additional fastening sections is located,
   one of the three vertices forms a middle vertex through which an axis of symmetry of the strut passes,
   first leg sections extend from the middle vertex in a direction of the remaining vertices, and
   second leg sections extend from the remaining vertices to the first and second fastening sections, and
   the first leg sections are dimensioned such that the additional fastening section provided at the middle vertex is fastenable onto a front end module of the vehicle, and the additional fastening sections located at the remaining vertices are fastenable in a region of suspension strut mounts of the vehicle, and
   the second leg sections are dimensioned such that the first fastening section and the second fastening section are each fastenable onto a lateral support bracket of the vehicle body.

2. The strut according to claim 1, wherein
   further fastening sections are provided in the first leg sections between the middle vertex and the remaining vertices, and the strut is fastenable as intended by way of the further fastening sections onto a reference strut connecting the lateral support bracket.

3. The strut according to claim 1, wherein the strut is formed by a base body which defines the profile and into which the first and second fastening sections and the additional fastening sections are integrated.

4. The strut according to claim 2, wherein the strut is formed by a base body which defines the profile and into which the first and second fastening sections and the additional fastening sections are integrated.

5. The strut according to claim 2, wherein the strut is formed from a base body, which defines the profile and into which the first and second fastening sections, the further fastening sections and the additional fastening sections are integrated.

6. The strut according to claim 3, wherein the base body is formed in one piece from a fiber-plastic composite material.

7. The strut according to claim 5, wherein the base body is formed in one piece from a fiber-plastic composite material.

8. The strut according to claim 1, wherein the strut is configured to reinforce an engine compartment of the vehicle body.

9. A front end module for a vehicle, comprising:
   a strut according to claim 1, wherein
   the strut having the additional fastening section located on the middle vertex is fastened onto a front cross strut of the front end module.

10. A strut for reinforcing a vehicle body of a vehicle, comprising:
- a first fastening section of the strut and a second fastening section of the strut, the first and second fastening sections being configured to fasten the strut onto respective left and right lateral support brackets of the vehicle body;
- a first additional fastening section of the strut configured to additionally fasten the strut to a separate front end module that is fastenable to the vehicle body, wherein
- the strut has a profile in an installed state that, projected onto an X-Y plane, comprises at least two vertices between the first fastening section and the second fastening section, wherein the X direction corresponds to a longitudinal direction of the vehicle and the Y direction corresponds to a transverse direction of the vehicle, and
- the first, second and first additional fastening sections are discreet, non-continuous, releasable fastening points.

11. The strut according to claim 10, wherein the profile of the strut comprises three vertices, at each one of which a further additional fastening section is located.

12. The strut according to claim 11, wherein:
- one of the three vertices forms a middle vertex through which an axis of symmetry of the strut passes,
- first leg sections extend from the middle vertex in a direction of the remaining vertices, and
- second leg sections extend from the remaining vertices to the first and second fastening sections.

13. The strut according to claim 12, wherein
- the first leg sections are dimensioned such that the additional fastening section provided at the middle vertex is fastenable onto the front end module of the vehicle, and
- the additional fastening sections located at the remaining vertices are fastenable in a region of suspension strut mounts of the vehicle.

14. The strut according to claim 13, wherein further fastening sections are provided in the first leg sections between the middle vertex and the remaining vertices, and the strut is fastenable by way of the further fastening sections onto a cross strut connecting the left and right lateral support brackets of the vehicle body.

15. A strut for reinforcing a vehicle body engine compartment of a vehicle, comprising:
- a first fastening section of the strut and a second fastening section of the strut, the first and second fastening sections being configured to fasten the strut onto the vehicle body engine compartment; and
- one or more additional fastening sections of the strut configured to additionally fasten the strut to points in the vehicle, the one or more additional fastening sections being located between the first and second fastening sections, wherein
- the strut has a profile which in an installed condition extends in an X-Y plane of the vehicle and includes at least two vertices between the first fastening section and the second fastening section, and
- the first, second and one or more additional fastening sections are discreet, non-continuous, releasable fastening points.

16. The strut according to claim 15, wherein third and fourth fastening sections of the one or more additional fastening sections are each located at one of the at least two vertices, respectively.

17. The strut according to claim 15, wherein
- the profile of the strut comprises three vertices, at each one of which an additional one of the one or more additional fastening sections is located,
- one of the three vertices forms a middle vertex through which an axis of symmetry of the strut passes,
- first leg sections extend from the middle vertex in a direction of the remaining vertices, and
- second leg sections extend from the remaining vertices to the first and second fastening sections.

18. The strut according to claim 17, wherein
- the first leg sections are dimensioned such that the additional fastening section provided at the middle vertex is fastenable onto a front end module of the vehicle, and
- the additional fastening sections located at the remaining vertices are fastenable in a region of suspension strut mounts of the vehicle, and
- the second leg sections are dimensioned such that the first fastening section and the second fastening section are each fastenable onto a lateral support bracket of the vehicle body.

19. The strut according to claim 18, wherein
additional fastening sections are provided in the first leg sections between the middle vertex and the remaining vertices, and the strut is fastenable as intended by way of the additional fastening sections onto a reference strut connecting the lateral support bracket.

20. The strut according to claim 15, wherein the strut is formed by a base body which defines the profile and into which the first and second fastening sections and the additional fastening sections are integrated.

* * * * *